Patented Mar. 3, 1925.

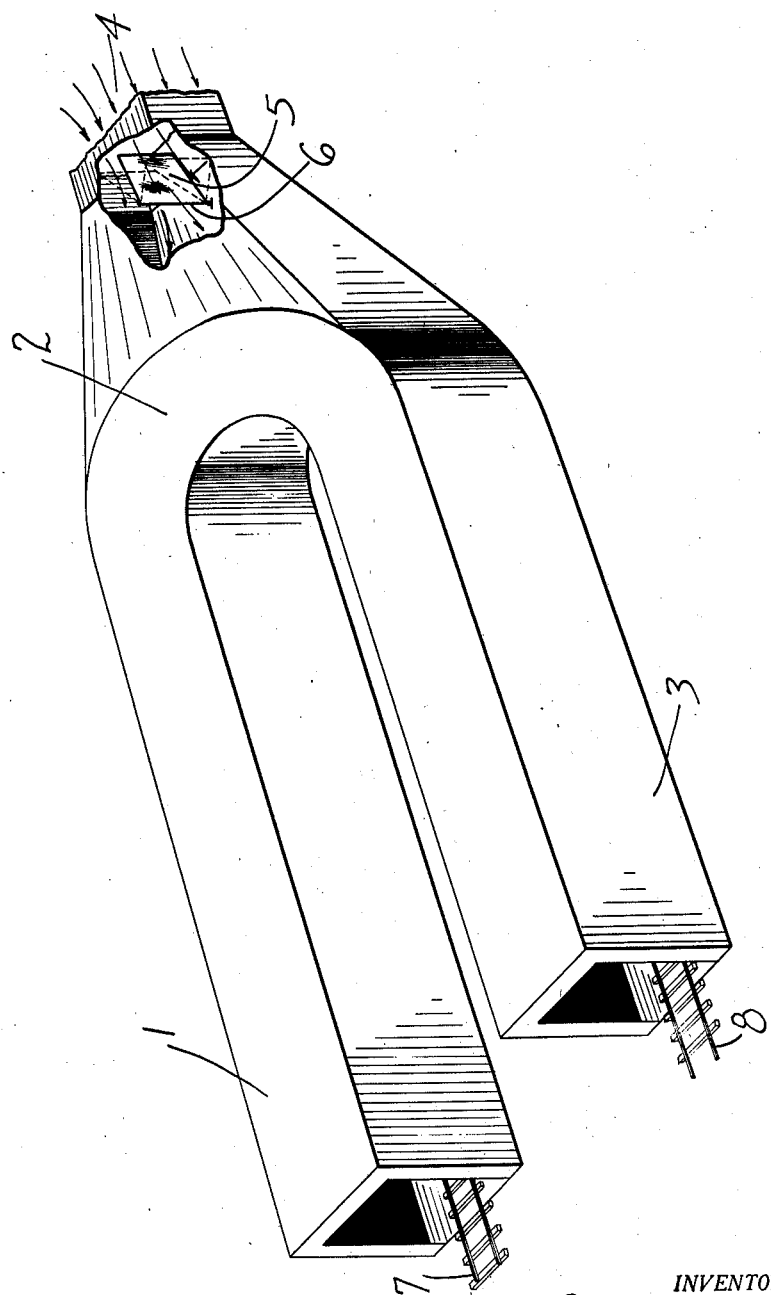

1,528,223

UNITED STATES PATENT OFFICE.

CHARLES C. MOORE, OF SAN FRANCISCO, CALIFORNIA.

APPARATUS FOR DEHYDRATION OF VEGETABLE MATERIALS.

Application filed February 21, 1922. Serial No. 538,366.

*To all whom it may concern:*

Be it known that I, CHARLES C. MOORE, of the city and county of San Francisco, and State of California, have invented certain new and useful apparatus for Dehydration of Vegetable Materials, of which the following is the specification.

In the dehydration of vegetable materials where a blast of hot air passes through a tunnel structure through which cars containing trays of the vegetable material are moved, certain observations have led to conclusions that are to be incorporated in my method for the impinging of the air, and it is this feature that constitutes the improvement that I claim is new and useful. The observations to which I make reference are as follows:

(1) In the drying of vegetable materials, moisture is expelled very much easier in the first half of the drying period than in the last half. For illustration, 75 per cent of the moisture may be expelled in the first half, and 25 per cent in the last half, even though the material is subjected to the same temperature throughout the period.

(2) Vegetable material can be subjected to a higher temperature, with less chance of injury by heat, when it has a sufficient moisture content than when the greater part of the moisture has been expelled. For illustration, a material containing 50 to 85 per cent of moisture can be subjected to temperature of 170 degrees Fahrenheit with less chance of injuring the product than when the material has been reduced to a moisture content of 10 to 50 per cent and subjected to the same temperature.

(3) If certain vegetable materials, such as prunes and grapes, be subjected to a high temperature at the commencement of the dehydration, there will be developed sufficient internal pressure to burst the skins of the material, thereby causing leakage of the juices.

(4) If the dehydration of vegetable materials is finished at a high temperature, the resultant product will have undergone a change in its constituents, such as the caramelization of sugars, and gelatinization of the starch.

For a practical illustration, there will be used the standard form of tunnel, (possibly 6 feet wide, 6 feet high, and 50 to 100 feet long), through which a blast of air heated to 170 degrees F., is passing over the vegetable material in trays loaded on cars that are moved through the tunnel, there being a train of cars the length of the tunnel.

To be in accord with (1), the cars should move against the air blast, for the reason that the temperature of the tunnel will be lower at the end where the air blast discharges from the tunnel than at the end where the air blast enters the tunnel, due to heat having been absorbed by the vegetable material. Therefore, the final period of dehydration will be when the material is subjected to the highest temperature in the tunnel.

To be in accord with (2), the cars should move in the direction of the air blast, as this would mean the cars are entered at the end of the tunnel where the air blast enters, and be subjected to the highest temperature when the material contains sufficient moisture to prevent injury by heat to the finished product. Therefore, the final period of dehydration will be when the material is subjected to the lowest temperature in the tunnel.

To be in accord with (3), the cars should be placed so that the material is not suddenly subjected to the highest temperature, as would be the case were the cars entered at the same end where the air blast enters the tunnel. Therefore the material must be heated gradually in order that the moisture that is easily expelled may be removed, thus lessening the tension on the skin before subjecting the material to the highest temperature.

To be in accord with (4), the cars should be placed so that the material will not be subjected to the highest temperature when the material is at its lowest moisture content. Therefore the material must be moved from the highest temperature in the tunnel whenever the moisture content of the material is low enough to cause the material to undergo a change in its constituents, such as a conversion of the sugars and modification of the starch granules.

The object in (1) is to obtain efficiency in dehydration; while the object in (2) is to obtain improvement in the finished product. Therefore these two objects are in conflict, if efficiency in dehydration and improvement in the finished product are given equal importance.

The object in (3) is to avoid injury to the material at the commencement of dehydration; while the object in (4) is to avoid injury to the material at the conclusion of dehydration.

It is obvious that what is required to comply as nearly as possible with the several objects is to have the train of cars move in the two directions. For illustration, to move toward the air blast part of the time, and in the same direction as the blast the remaining time; and during the total period of dehydration have all of the cars subjected to all of the air blast all of the time. It is, of course, not possible to accomplish this in a single tunnel that has the air blast entering at one end of the tunnel. My procedure, for complying with the several objects, is illustrated by the use of two tunnels, preferably parallel and adjacent; the air blast entering these tunnels at adjacent ends, and a communicating passage at these same adjacent ends permitting the train of cars to go from one tunnel into the other tunnel. This permits of entering the train of cars at the far end of one tunnel, having them move toward the air blast for part of the time; thus complying with objects (1) and (3); then have the train enter the near end of the other tunnel where the cars move in the direction of the air blast, thus complying with (2) and (4).

Figure 1 is a perspective view of two tunnels and their communicating passage; and air blast passage with the deflector for varying the proportions of air that passes through the tunnels.

The tunnels are shown at 1, and 3; the communicating passage at 2; the air blast passage at 4; the deflector at 5, on its vertical axis 6; the rail track, on which the cars move, at 7, and the other end of the same track at 8.

A train of cars, loaded with the material to be dehydrated, enters the tunnel 1, moves through it and through the communicating passage 2, and into and through the tunnel 3. When the deflector, 5, is set in line with the air currents, there will be equal amounts of air going into each tunnel. When it is required that more air go into one tunnel than goes into the other tunnel, the deflector is moved on its axis, 6, until the desired proportion of air enters the respective tunnels.

The train of cars must, necessarily, move at the same rate of speed in each tunnel; and with tunnels of equal length, it follows that the dehydration period is divided into two intervals, and that the cars move toward the air blast during one interval and in the same direction as the blast in the other interval. When these intervals do not properly balance for the material that is being dehydrated; that is to say, the moisture removed in one tunnel is not sufficient for the requirements for efficiency in dehydration and quality of finished product, the air blast will be deflected in a way such that a greater volume of air will pass through that tunnel than is passing through the other tunnel. This convenience of varying the volumes of air that will pass through the pair of tunnels will overcome any disadvantage due to the tunnels being of equal length. This may be set forth in a simple illustration as follows;

Assume equal volumes of air are passing through the pair of tunnels of equal length, and it is found that the highest degree of possible efficiency is not obtained. The procedure would be to deflect, possibly, two-thirds of the air to one tunnel while the remaining third went to the other tunnel. If this does not lead to improvement in efficiency, the deflection should be the reverse of what has been tested in the first instance. When the proper direction of deflection has been determined, the next procedure is to vary the proportion of the deflection until the highest possible efficiency in dehydration and quality of finished product has been established for the material that is being dehydrated. For any other material, of a different nature, the entire procedure is, again, followed in order to establish the requisite conditions for a proper dehydration of that material. Eventually, the operator would know the required air deflection for prunes, when in a certain condition; grapes, when in a certain condition; and so on.

Having thus fully described my invention, what I claim as new and desire to secure by Letters Patent of the United States, is:—

1. In a dehydration system, the combination of two tunnels, a communicating passage between the end of one tunnel and the adjacent end of the other tunnel, means for simultaneously sending a blast of air through each tunnel toward the end farthest from the communicating passage, and means for apportioning the blast of air such that a greater mass of air will pass through one tunnel than will pass through the other tunnel.

2. In a dehydration system, the combination of two tunnels, a communicating passage between the end of one tunnel and the adjacent end of the other tunnel, means for simultaneously sending a blast of air through each tunnel toward the end farthest from the communicating passage, means for apportioning the blast of air such that a greater mass of air will pass through one tunnel than will pass through the other tunnel, and means for moving the same material that is being dehydrated toward the blast of air in one tunnel and then in the direction of the blast of air in the other tunnel.

3. In a dehydration system the combination of a tunnel, means for sending a blast of air into the tunnel, means for dividing the blast of air into two columns such that one column moves toward one end of the tunnel and the other column moves toward the other end of the tunnel, and means for apportioning the blast of air such that a greater mass of air will be in one of the columns than will be in the other column of air.

4. In a dehydration system the combination of a tunnel, means for sending a blast of air into the tunnel, means for dividing the blast of air into two columns such that one column moves toward one end of the tunnel and the other column of air moves toward the other end of the tunnel, means for apportioning the blast of air such that a greater mass of air will be in one of the columns than will be in the other column of air, and means for moving the same material that is being dehydrated through one of the columns of air and then through the other column of air.

5. In a dehydration system, the combination of two enclosures adapted to receive produce to be dried therein by the passing of air through the enclosures, an air passage common to the said enclosures through which air under pressure is passed, and means for apportioning the passing air such that a greater volume of air will pass through one of the said enclosures than will pass through the other said enclosure.

6. In a dehydration system, the combination of two enclosures adapted to receive produce to be dried therein by the passing of air through the enclosures, an air passage common to the said enclosures through which air under pressure is passed, means for apportioning the passing air such that a greater volume of air will pass through one of the said enclosures than will pass through the other said enclosure, and means for sending the produce that is being dried from one of the said enclosures into the other one of the said enclosures.

7. In a dehydration system, the combination of a plurality of enclosures adapted to receive produce to be dried therein by the passing of air through the enclosures, an air passage common to the plurality of said enclosures through which air under pressure is passed, and means for apportioning the passing air such that a greater volume of air will pass through one of the said enclosures than will pass through another of the said enclosures.

8. In a dehydration system, the combination of a plurality of enclosures adapted to receive produce to be dried therein by the passing of air through the enclosures, an air passage common to the plurality of said enclosures through which air under pressure is passed, means for apportioning the passing air such that a greater volume of air will pass through one of the said enclosures than will pass through another of the said enclosures, and means for sending produce that is being dried from one of the said enclosures into another of the said enclosures.

In testimony whereof I have hereunto signed my name in the presence of two subscribing witnesses.

CHARLES C. MOORE.

Witnesses:
 ELIZABETH NORTON,
 FRED NORTON.